United States Patent
Lindemann

(10) Patent No.: US 9,450,760 B2
(45) Date of Patent: Sep. 20, 2016

(54) SYSTEM AND METHOD FOR AUTHENTICATING A CLIENT TO A DEVICE

(71) Applicant: NOK NOK LABS, INC., Palo Alto, CA (US)

(72) Inventor: Rolf Lindemann, Kiefernbruch (DE)

(73) Assignee: NOK NOK LABS, INC., Palo Alto, CA (US)

( * ) Notice: Subject to any disclaimer, the term of this patent is extended or adjusted under 35 U.S.C. 154(b) by 0 days.

(21) Appl. No.: 14/448,641

(22) Filed: Jul. 31, 2014

(65) Prior Publication Data

US 2016/0241403 A1 Aug. 18, 2016

(51) Int. Cl.
*H04L 9/32* (2006.01)
*H04L 29/06* (2006.01)

(52) U.S. Cl.
CPC .............. *H04L 9/3247* (2013.01); *H04L 63/06* (2013.01)

(58) Field of Classification Search
CPC ........................ H04L 9/3247; H04L 63/016
USPC ....................................................... 713/176
See application file for complete search history.

(56) References Cited

U.S. PATENT DOCUMENTS

| | | | |
|---|---|---|---|
| 7,512,567 B2 | 3/2009 | Bemmel et al. | |
| 2003/0152252 A1 | 8/2003 | Kondo | |
| 2006/0282670 A1* | 12/2006 | Karchov | H04L 63/0823 713/175 |
| 2009/0193508 A1 | 7/2009 | Brenneman | |
| 2009/0307139 A1 | 12/2009 | Mardikar et al. | |
| 2011/0307949 A1* | 12/2011 | Ronda | H04L 9/3213 726/9 |

OTHER PUBLICATIONS

Barker et al; "Recommendation for key management Part 3: Application—Specific Key Management Guidance" ; NIST special Publication 800-57, pp. 1-103, Dec. 2009.*
Office Action from U.S. Appl. No. 14/218,551, mailed May 12, 2016, 11 pages.
Notice of Allowance from U.S. Appl. No. 14/487,992, mailed May 12, 2016, 11 pages.
Final Office Action from U.S. Appl. No. 14/448,814, mailed Jun. 14, 2016, 17 pages.

(Continued)

*Primary Examiner* — Hadi Armouche
*Assistant Examiner* — Angela Holmes
(74) *Attorney, Agent, or Firm* — Nicholson De Vos Webster & Elliott LLP

(57) ABSTRACT

A system, apparatus, method, and machine readable medium are described for authenticating a client to a device. For example, one embodiment of a method comprises: registering an authenticator of a client with a relying party, the registration allowing a user of the client to remotely authenticate the user to the relying party over a network; generating a first authentication structure using at least a first authentication key associated with the authenticator and a signature generated with a first verification key; caching the first authentication structure on the client; providing a second verification key corresponding to the first verification key to a transaction device; performing an authentication transaction between the client and the transaction device in which the client generates a second authentication structure using a second authentication key associated with the first authentication key, the transaction device uses the second verification key to validate the signature on the first authentication structure and uses the first authentication key to validate the second authentication structure.

26 Claims, 14 Drawing Sheets

(56) References Cited

OTHER PUBLICATIONS

Office Action from U.S. Appl. No. 14/066,273, mailed Jun. 16, 2016, 43 pages.

Notice of Allowance from U.S. Appl. No. 14/448,641, mailed Jun. 7, 2016, 13 pages.

Office Action from U.S. Appl. No. 14/218,611, mailed Jun. 16, 2016, 13 pages.

* cited by examiner

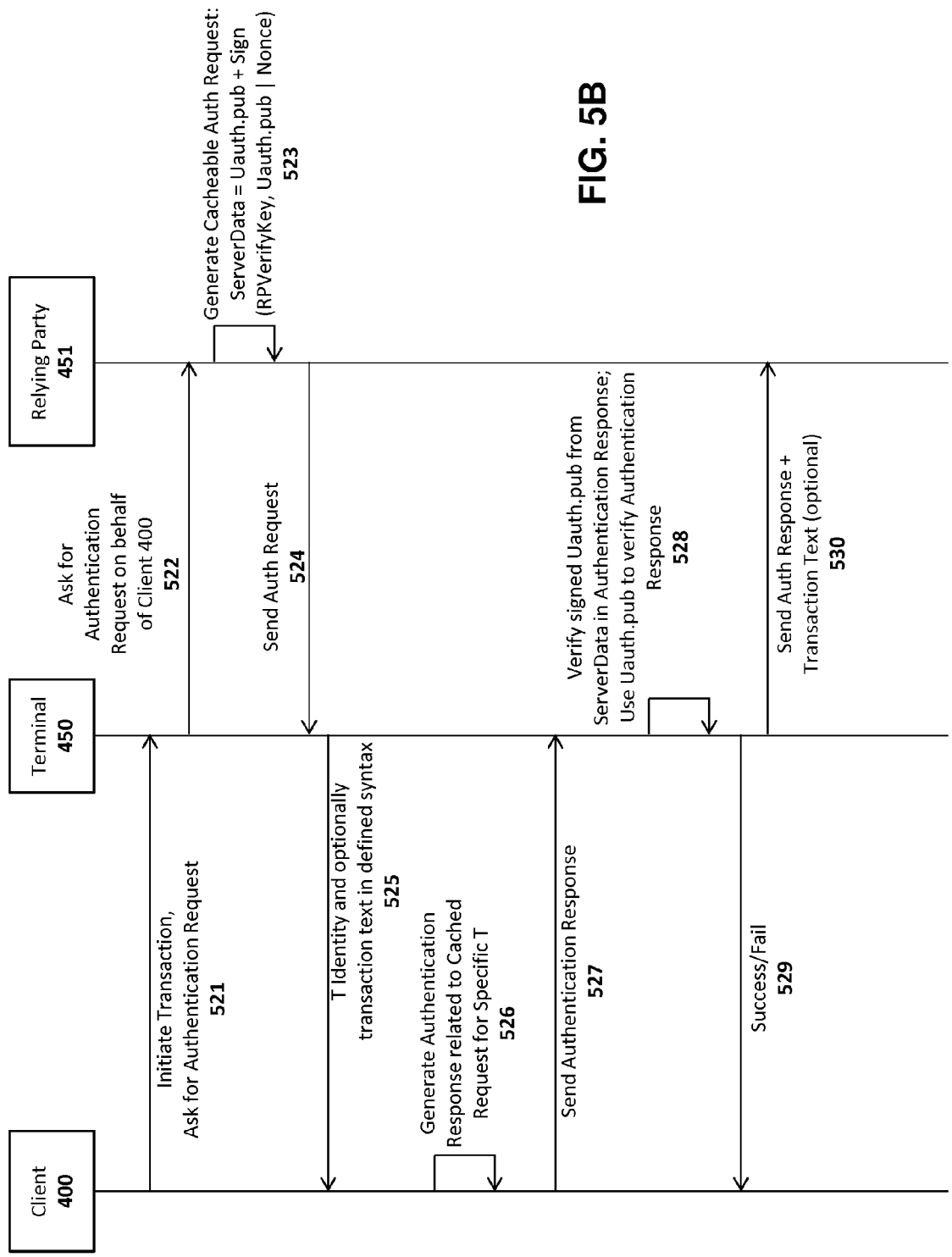

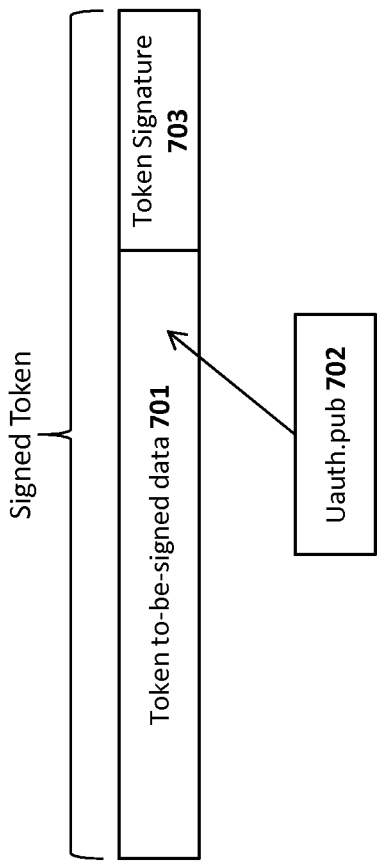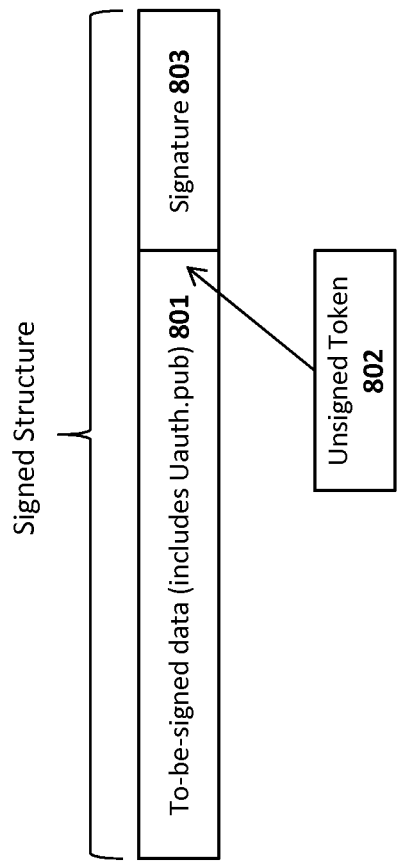

SYSTEM AND METHOD FOR AUTHENTICATING A CLIENT TO A DEVICE

BACKGROUND

1. Field of the Invention

This invention relates generally to the field of data processing systems. More particularly, the invention relates to a system and method for authenticating a client to a device such as an offline device or a device having limited connectivity to a relying party.

2. Description of Related Art

FIG. 1 illustrates an exemplary client 120 with a biometric device 100. When operated normally, a biometric sensor 102 reads raw biometric data from the user (e.g., capture the user's fingerprint, record the user's voice, snap a photo of the user, etc) and a feature extraction module 103 extracts specified characteristics of the raw biometric data (e.g., focusing on certain regions of the fingerprint, certain facial features, etc). A matcher module 104 compares the extracted features 133 with biometric reference data 110 stored in a secure storage on the client 120 and generates a score 153 based on the similarity between the extracted features and the biometric reference data 110. The biometric reference data 110 is typically the result of an enrollment process in which the user enrolls a fingerprint, voice sample, image or other biometric data with the device 100. An application 105 may then use the score 135 to determine whether the authentication was successful (e.g., if the score is above a certain specified threshold).

Systems have also been designed for providing secure user authentication over a network using biometric sensors. In such systems, the score 135 generated by the application 105, and/or other authentication data, may be sent over a network to authenticate the user with a remote server. For example, Patent Application No. 2011/0082801 ("'801 application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

The assignee of the present application has developed a variety of improvements to the authentication framework described in the '801 application. Some of these improvements are described in the following set of U.S. patent applications ("Co-pending applications"), all filed Dec. 29, 1012, which are assigned to the present assignee: Ser. No. 13/730,761, Query System and Method to Determine Authentication Capabilities; Ser. No. 13/730,776, System and Method for Efficiently Enrolling, Registering, and Authenticating With Multiple Authentication Devices; Ser. No. 13/730,780, System and Method for Processing Random Challenges Within an Authentication Framework; Ser. No. 13/730,791, System and Method for Implementing Privacy Classes Within an Authentication Framework; Ser. No. 13/730,795, System and Method for Implementing Transaction Signaling Within an Authentication Framework.

Briefly, the Co-Pending Applications describe authentication techniques in which a user enrolls with biometric devices of a client to generate biometric template data (e.g., by swiping a finger, snapping a picture, recording a voice, etc); registers the biometric devices with one or more servers over a network (e.g., Websites or other relying parties equipped with secure transaction services as described in the Co-Pending Applications); and subsequently authenticates with those servers using data exchanged during the registration process (e.g., encryption keys provisioned into the biometric devices). Once authenticated, the user is permitted to perform one or more online transactions with a Website or other relying party. In the framework described in the Co-Pending Applications, sensitive information such as fingerprint data and other data which can be used to uniquely identify the user, may be retained locally on the user's client device (e.g., smartphone, notebook computer, etc) to protect a user's privacy.

BRIEF DESCRIPTION OF THE DRAWINGS

A better understanding of the present invention can be obtained from the following detailed description in conjunction with the following drawings, in which:

FIGS. 5A-B are transaction diagrams showing two different embodiments for performing authentication for a transaction;

FIGS. 7-8 illustrate different embodiments of bearer tokens employed in different embodiments of the invention;

DETAILED DESCRIPTION OF PREFERRED EMBODIMENTS

Figure 1:
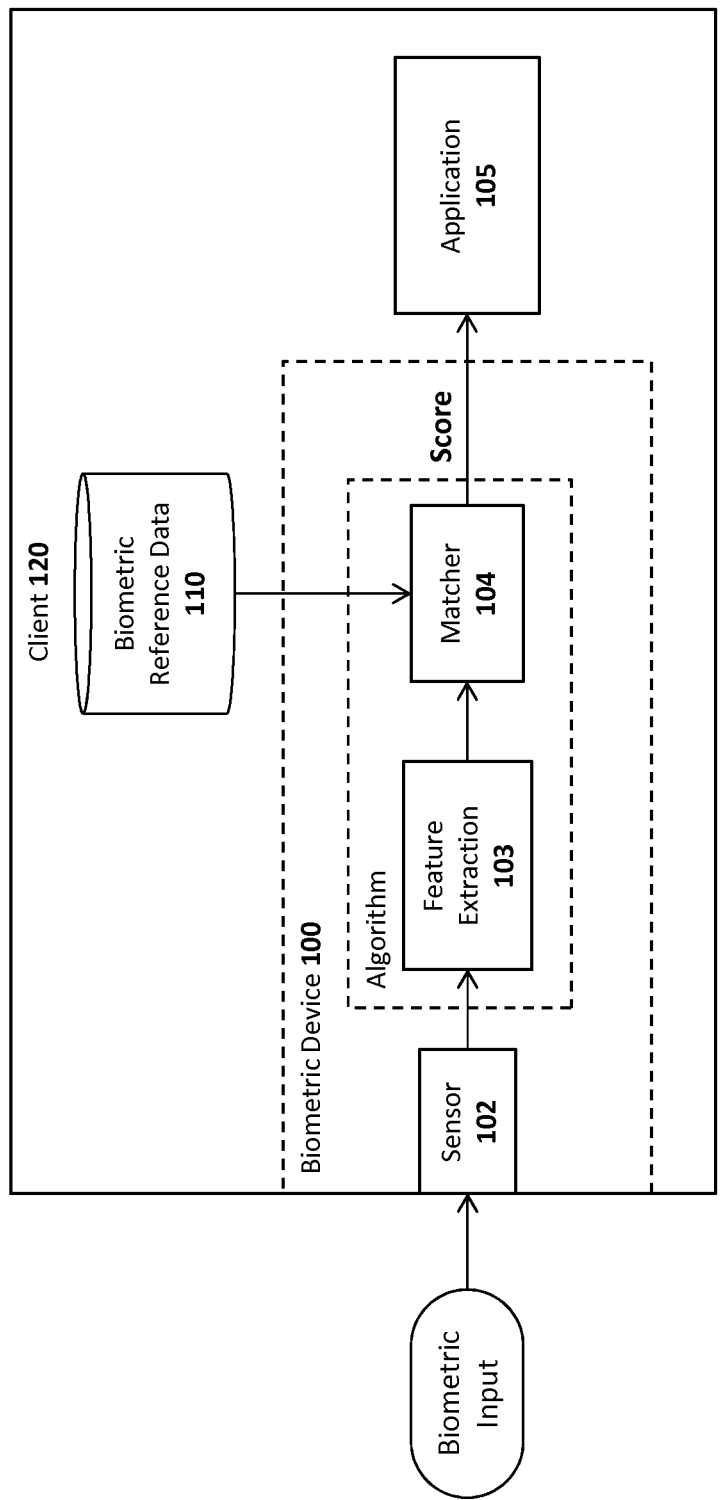
FIG. 1 illustrates an exemplary client device having biometric authentication capabilities.

Described below are embodiments of an apparatus, method, and machine-readable medium for implementing advanced authentication techniques and associated applications. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve client devices with authentication capabilities such as biometric devices or PIN entry. These devices are sometimes referred to herein as "tokens," "authentication devices," or "authenticators." While certain embodiments focus on facial recognition hardware/software (e.g., a camera and associated software for recognizing a user's face and tracking a user's eye movement), some embodiments may utilize additional biometric devices including, for example, fingerprint sensors, voice recognition hardware/software (e.g., a microphone and associated software for recognizing a user's voice), and optical recognition capabilities (e.g., an optical scanner and associated software for scanning the retina of a user). The authentication capabilities may also include non-biometric devices such as trusted platform modules (TPMs) and smartcards.

In a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication and integrity protection) and/or whether a hacker has compromised the biometric device. Confidence in the biometric device depends on the particular implementation of the device.

However, as discussed below, the authentication techniques employed to authenticate the user may involve non-location components such as communication over a network with remote servers and/or other data processing devices. Moreover, while specific embodiments are described herein (such as an ATM and retail location) it should be noted that the underlying principles of the invention may be implemented within the context of any system in which a transaction is initiated locally or remotely by an end user.

The term "relying party" is sometimes used herein to refer, not merely to the entity with which a user transaction is attempted (e.g., a Website or online service performing user transactions), but also to the secure transaction servers implemented on behalf of that entity which may performed the underlying authentication techniques described herein. The secure transaction servers which provided remote authentication capabilities may be owned and/or under the control of the relying party or may be under the control of a third party offering secure transaction services to the relying party as part of a business arrangement.

The term "server" is used herein to refer to software executed on a hardware platform (or across multiple hardware platforms) that receives requests over a network from a client, responsively performs one or more operations, and transmits a response to the client, typically including the results of the operations. The server responds to client requests to provide, or help to provide, a network "service" to the clients. Significantly, a server is not limited to a single computer (e.g., a single hardware device for executing the server software) and may, in fact, be spread across multiple hardware platforms, potentially at multiple geographical locations.

The embodiments of the invention described herein include techniques for authenticating a user for a transaction initiated through a secure transaction device. By way of example, the transaction may be a withdrawal, transfer, or other user-initiated operation and the transaction device may be an automatic teller machine (ATM), point-of-sale (PoS) transaction device or other device capable of executing transactions on behalf of the user. The transaction may involve, for example, completing a payment to purchase goods or services at a retail store or other retail location equipped with the device, withdrawing funds via the device, performing maintenance on the device, or any other transaction for which user authentication is required.

One embodiment of the invention provides techniques for authenticating the user locally (i.e. verifying the user), even in circumstances where the device is offline (i.e., not connected to a back-end authentication server) or semi-offline (i.e., only periodically connected to a back-end authentication server). In one embodiment, the user's client device is provided with the ability to cache authentication requests generated by a back-end authentication server (e.g., operated on behalf of the relying party) and the device is provided with data needed to verify the authentication response transmitted from the user's client device to the device.

Prior to discussing the details of these embodiments of the invention, an overview of remote user authentication techniques will be provided. These and other remote user authentication techniques are described in the co-pending applications, which are assigned to the assignee of the present application and incorporated herein by reference.

Remote User Authentication Techniques

Figure 2A:
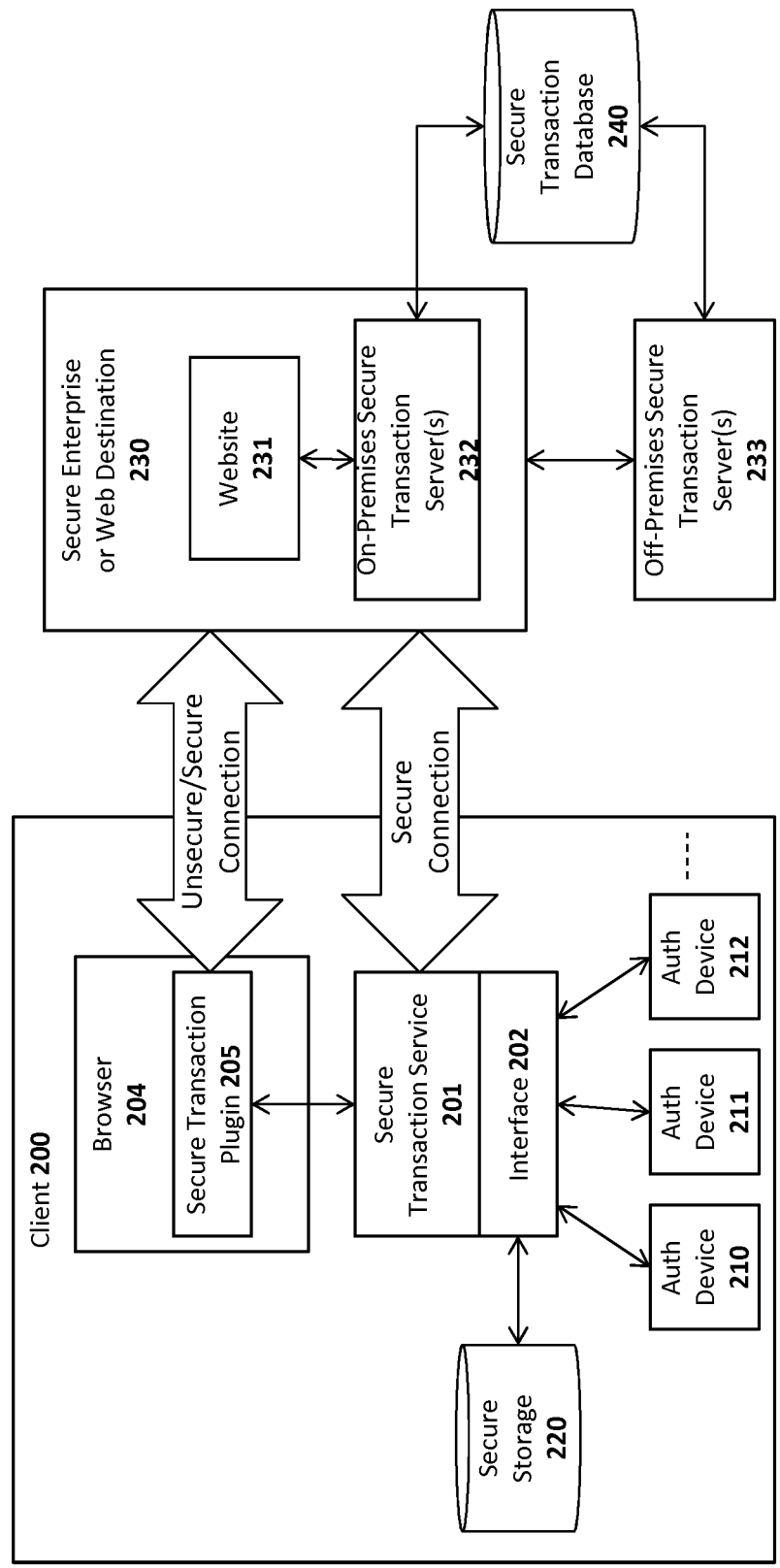
FIGS. 2A-B illustrate two different embodiments of a secure authentication system architecture.
Figure 2B:
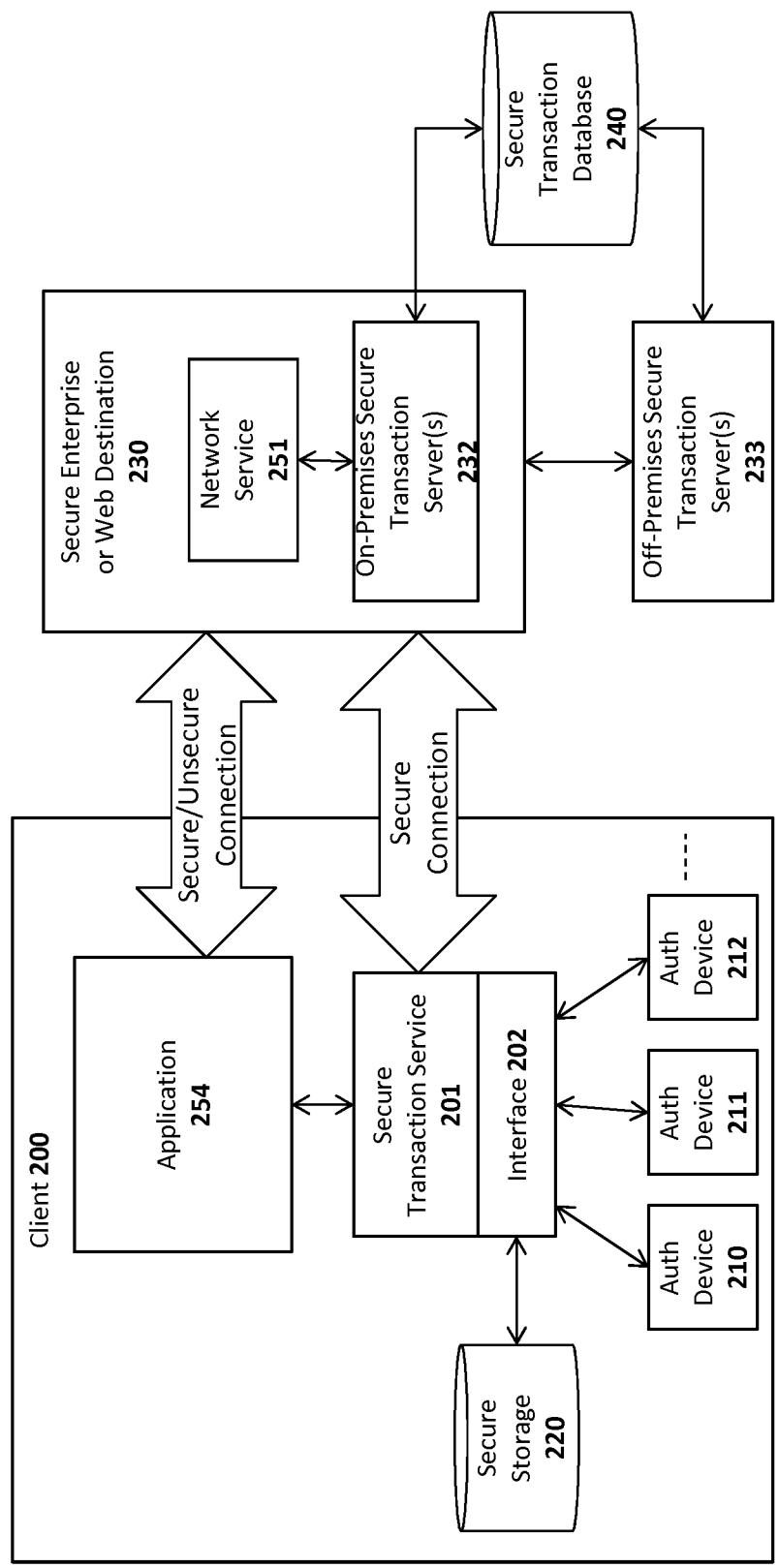

FIGS. 2A-B illustrate two embodiments of a system architecture comprising client-side and server-side components for remotely authenticating a user. The embodiment shown in FIG. 2A uses a browser plugin-based architecture for communicating with a website while the embodiment shown in FIG. 2B does not require a browser. The various authentication techniques and associated applications described herein may be implemented on either of these system architectures. For example, the authentication engines within client devices described herein may be implemented as part of the secure transaction service 201 including interface 202. It should be noted, however, that the embodiments described above may be implemented using logical arrangements of hardware and software other than those shown in FIGS. 2A-B.

Turning to FIG. 2A, the illustrated embodiment includes a client 200 equipped with one or more authentication devices 210-212 for enrolling and authenticating an end user. As mentioned above, the authentication devices 210-212 may include biometric devices such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and non-biometric devices such as a trusted platform modules (TPMs) and smartcards. A user may enroll the biometric devices by providing biometric data (e.g., swiping a finger on the fingerprint device) which the secure transaction service 201 may store as biometric template data in secure storage 220 (via interface 202).

While the secure storage 220 is illustrated outside of the secure perimeter of the authentication device(s) 210-212, in one embodiment, each authentication device 210-212 may have its own integrated secure storage. Additionally, each authentication device 210-212 may cryptographically protect the biometric reference data records (e.g., wrapping them using a symmetric key to make the storage 220 secure).

The authentication devices 210-212 are communicatively coupled to the client through an interface 202 (e.g., an application programming interface or API) exposed by a secure transaction service 201. The secure transaction service 201 is a secure application for communicating with one or more secure transaction servers 232-233 over a network and for interfacing with a secure transaction plugin 205 executed within the context of a web browser 204. As illustrated, the Interface 202 may also provide secure access to a secure storage device 220 on the client 200 which stores information related to each of the authentication devices 210-212 such as a device identification code (such as an Authenticator Attestation ID (AAID)), user identification code, user enrollment data (e.g., scanned fingerprint or other biometric data), and keys used to perform the secure authentication techniques described herein. For example, as discussed in detail below, a unique key may be stored into each of the authentication devices and subsequently used when communicating to servers 230 over a network such as the Internet.

As discussed below, certain types of network transactions are supported by the secure transaction plugin 205 such as HTTP or HTTPS transactions with websites 231 or other servers. In one embodiment, the secure transaction plugin is initiated in response to specific HTML tags inserted into the HTML code of a web page by the web server 231 within the secure enterprise or Web destination 230 (sometimes simply referred to below as "server 230"). In response to detecting such a tag, the secure transaction plugin 205 may forward transactions to the secure transaction service 201 for processing. In addition, for certain types of transactions (e.g., such as secure key exchange) the secure transaction service 201 may open a direct communication channel with the on-premises transaction server 232 (i.e., co-located with the website) or with an off-premises transaction server 233.

The secure transaction servers 232-233 are coupled to a secure transaction database 240 for storing user data, authentication device data, keys and other secure information needed to support the secure authentication transactions described below. It should be noted, however, that the underlying principles of the invention do not require the separation of logical components within the secure enterprise or web destination 230 shown in FIG. 2A. For example, the website 231 and the secure transaction servers 232-233 may be implemented within a single physical server or separate physical servers. Moreover, the website 231 and transaction servers 232-233 may be implemented within an integrated software module executed on one or more servers for performing the functions described below.

As mentioned above, the underlying principles of the invention are not limited to a browser-based architecture shown in FIG. 2A. FIG. 2B illustrates an alternate implementation in which a stand-alone application 254 utilizes the functionality provided by the secure transaction service 201 to authenticate a user over a network. In one embodiment, the application 254 is designed to establish communication sessions with one or more network services 251 which rely on the secure transaction servers 232-233 for performing the user/client authentication techniques described in detail below.

In either of the embodiments shown in FIGS. 2A-B, the secure transaction servers 232-233 may generate the keys which are then securely transmitted to the secure transaction service 201 and stored into the authentication devices within the secure storage 220. Additionally, the secure transaction servers 232-233 manage the secure transaction database 240 on the server side.

Figure 2C:
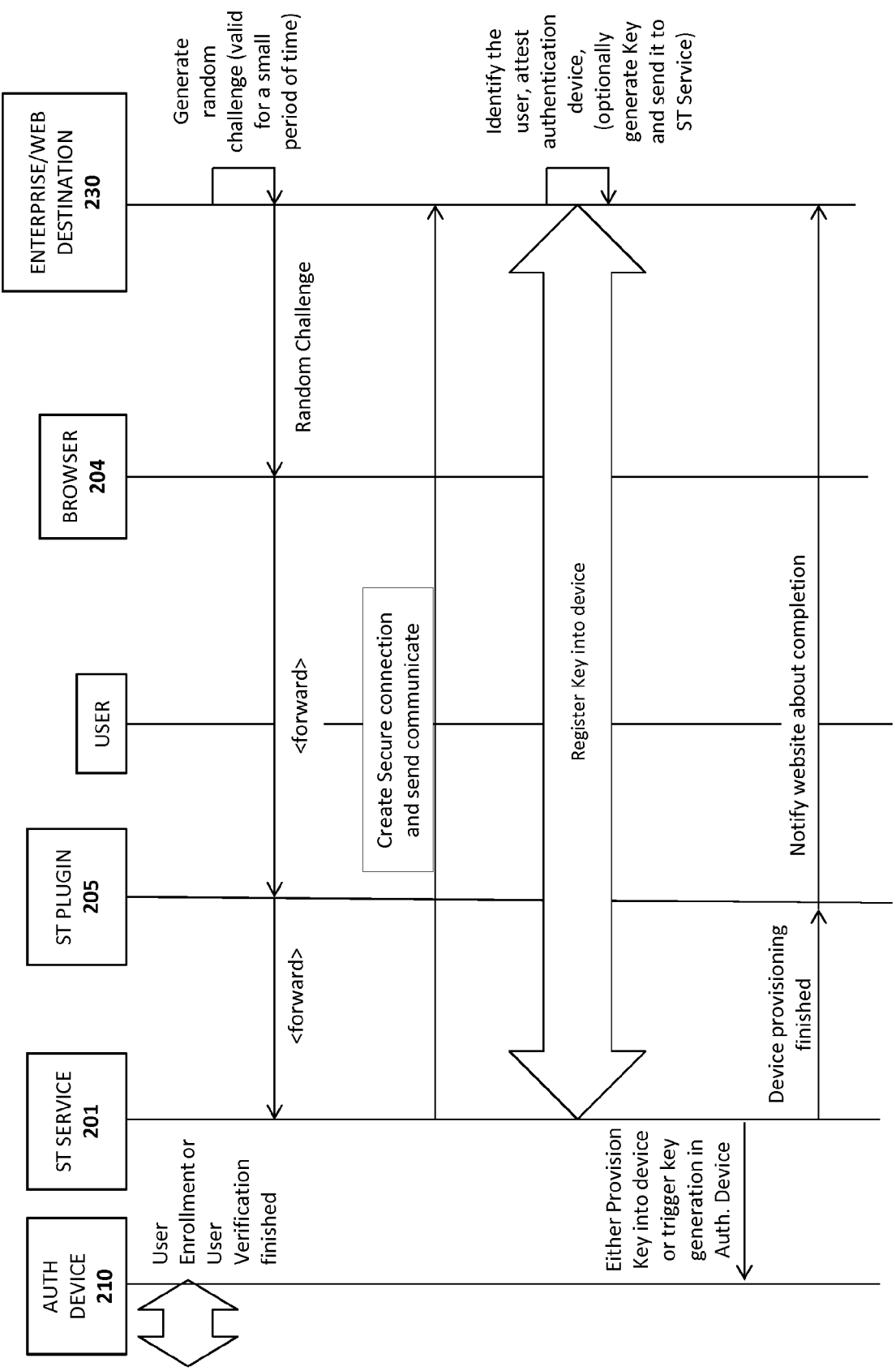
FIG. 2C illustrates a transaction diagram showing how keys may be registered into authentication devices.

FIG. 2C illustrates a series of transactions for registering authentication devices. As mentioned above, during registration, a key is shared between the authentication device and one of the secure transaction servers 232-233. The key is stored within the secure storage 220 of the client 200 and the secure transaction database 220 used by the secure transaction servers 232-233. In one embodiment, the key is a symmetric key generated by one of the secure transaction servers 232-233. However, in another embodiment discussed below, asymmetric keys may be used. In this embodiment, the public key may be stored by the secure transaction servers 232-233 and a second, related private key may be stored in the secure storage 220 on the client. Moreover, in another embodiment, the key(s) may be generated on the client 200 (e.g., by the authentication device or the authentication device interface rather than the secure transaction servers 232-233). The underlying principles of the invention are not limited to any particular types of keys or manner of generating the keys.

A secure key provisioning protocol such as the Dynamic Symmetric Key Provisioning Protocol (DSKPP) may be used to share the key with the client over a secure communication channel (see, e.g., Request for Comments (RFC) 6063). However, the underlying principles of the invention are not limited to any particular key provisioning protocol.

Turning to the specific details shown in FIG. 2C, once the user enrollment or user verification is complete, the server 230 generates a randomly generated challenge (e.g., a cryptographic nonce) that must be presented by the client during device registration. The random challenge may be valid for a limited period of time. The secure transaction plugin detects the random challenge and forwards it to the secure transaction service 201. In response, the secure transaction service initiates an out-of-band session with the server 230 (e.g., an out-of-band transaction) and communicates with the server 230 using the key provisioning protocol. The server 230 locates the user with the user name, validates the random challenge, validates the device's attestation code (e.g., AAID) if one was sent, and creates a new entry in the secure transaction database 220 for the user. It may also generate the key or public/private key pair, write the key(s) to the database 220 and send the key(s) back to the secure transaction service 201 using the key provisioning protocol. Once complete, the authentication device and the server 230 share the same key if a symmetric key was used or different keys if asymmetric keys were used.

Figure 3A:
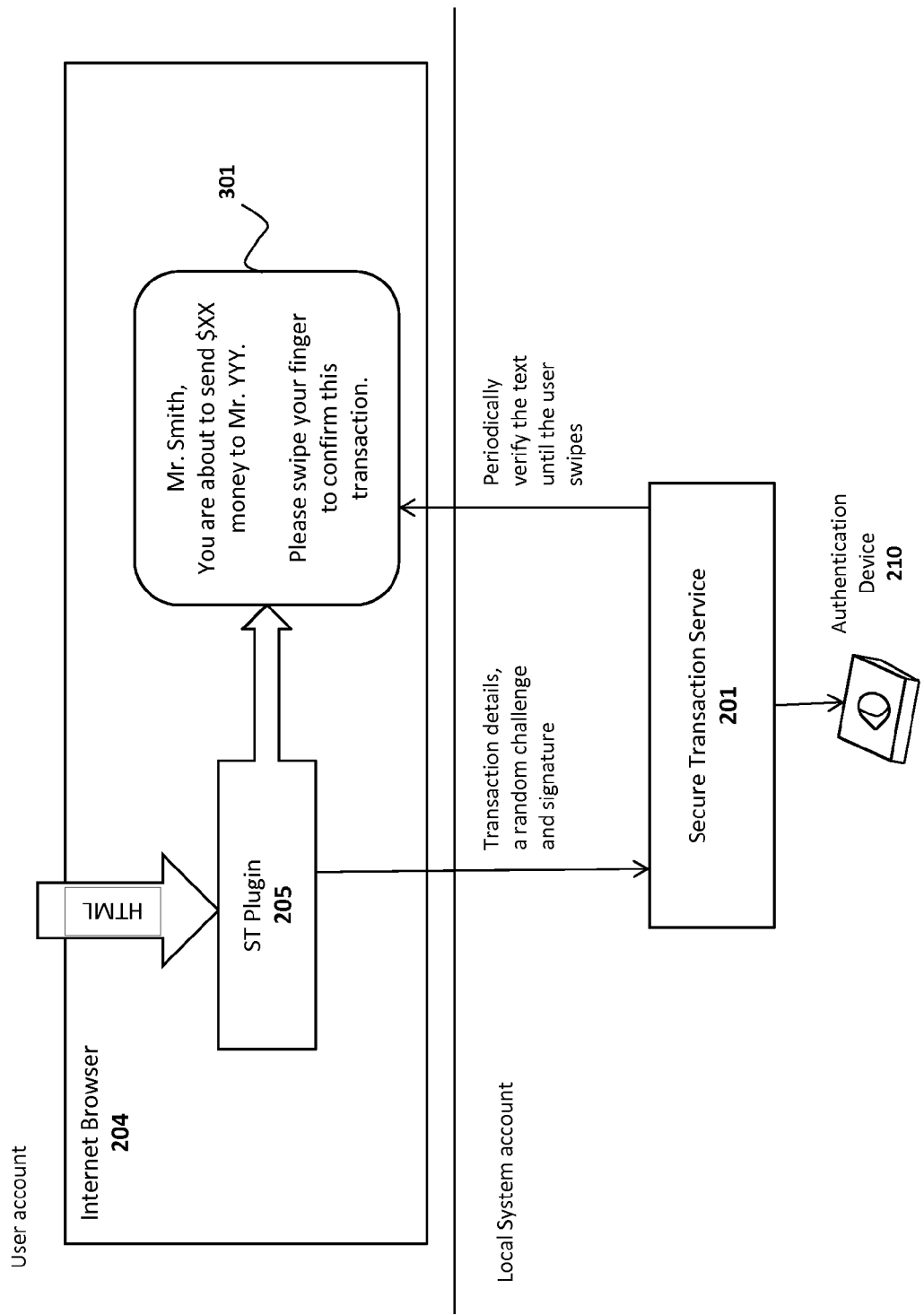
FIGS. 3A-B illustrates embodiments for secure transaction confirmation using a secure display.

FIG. 3A illustrates a secure transaction confirmation for a browser-based implementation. While a browser-based implementation is illustrated, the same basic principles may be implemented using a stand-alone application or mobile device app.

The secure transaction confirmation is designed to provide stronger security for certain types of transactions (e.g., financial transactions). In the illustrated embodiment, the user confirms each transaction prior to committing the transaction. Using the illustrated techniques, the user confirms exactly what he/she wants to commit and commits exactly what he/she sees displayed in a window 301 of the graphical user interface (GUI). In other words, this embodiment ensures that the transaction text cannot be modified by a "man in the middle" (MITM) or "man in the browser" (MITB) to commit a transaction which the user did not confirm.

In one embodiment, the secure transaction plugin 205 displays a window 301 in the browser context to show the transaction details. The secure transaction server 201 periodically (e.g., with a random interval) verifies that the text that is shown in the window is not being tampered by anyone (e.g., by generating a hash/signature over the displayed text). In a different embodiment, the authentication device has a trusted user interface (e.g. providing an API compliant to GlobalPlatform's TrustedUI).

The following example will help to highlight the operation of this embodiment. A user chooses items for purchase from a merchant site and selects "check out." The merchant site sends the transaction to a service provide which has a secure transaction server 232-233 implementing one or more of the embodiments of the invention described herein (e.g., PayPal). The merchant site authenticates the user and completes the transaction.

The secure transaction server 232-233 receives the transaction details (TD) and puts a "Secure Transaction" request in an HTML page and sends to client 200. The Secure Transaction request includes the transaction details and a random challenge. The secure transaction plugin 205 detects the request for transaction confirmation message and forwards all data to the secure transaction service 201. In an embodiment which does not use a browser or plugin, the information may be sent directly from the secure transaction servers to the secure transaction service on the client 200.

For a browser-based implementation, the secure transaction plugin 205 displays a window 301 with transaction details to the user (e.g. in a browser context) and asks the user to provide authentication to confirm the transaction. In an embodiment which does not use a browser or plugin, the secure transaction service 201, the application 254 (FIG. 2B), or the authentication device 210 may display the window 301. The secure transaction service 201 starts a timer and verifies the content of the window 301 being displayed to the user. The period of verification may be randomly chosen. The secure transaction service 201 ensures that user sees the valid transaction details in the window 301 (e.g., generating a hash on the details and verifying that the contents are accurate by comparing against a hash of the correct contents). If it detects that the content has been tampered with it prevents the confirmation token/signature from being generated.

After the user provides valid verification data (e.g. by, swiping a finger on the fingerprint sensor), the authentication device verifies the user and generates a cryptographic signature (sometimes referred to as a "token") with the transaction details and the random challenge (i.e., the signature is calculated over the transaction details and the nonce). This allows the secure transaction server 232-233 to ensure that the transaction details have not been modified between the server and the client. The secure transaction service 201 sends the generated signature and username to the secure transaction plugin 205 which forwards the signature to the secure transaction server 232-233. The secure transaction server 232-233 identifies the user with the username and verifies the signature. If verification succeeds, a confirmation message is sent to the client and the transaction is processed.

One embodiment of the invention implements a query policy in which a secure transaction server transmits a server policy to the client indicating the authentication capabilities accepted by the server. The client then analyzes the server policy to identify a subset of authentication capabilities which it supports and/or which the user has indicated a desire to use. The client then registers and/or authenticates the user using the subset of authentication tokens matching the provided policy. Consequently, there is a lower impact to the client's privacy because the client is not required to transmit exhaustive information about its authentication capabilities (e.g., all of its authentication devices) or other information which might be used to uniquely identify the client.

By way of example, and not limitation, the client may include numerous user verification capabilities such as a fingerprint sensor, voice recognition capabilities, facial recognition capabilities, eye/optical recognition capabilities, PIN verification, to name a few. However, for privacy reasons, the user may not wish to divulge the details for all of its capabilities to a requesting server. Thus, using the techniques described herein, the secure transaction server may transmit a server policy to the client indicating that it supports, for example, fingerprint, optical, or smartcard authentication. The client may then compare the server policy against its own authentication capabilities and choose one or more of the available authentication options.

One embodiment of the invention employs transaction signing on the secure transaction server so that no transaction state needs to be maintained on the server to maintain sessions with clients. In particular, transaction details such as transaction text displayed within the window 301 may be sent to the client signed by the server. The server may then verify that the signed transaction responses received by the client are valid by verifying the signature. The server does not need to persistently store the transaction content, which would consume a significant amount of storage space for a large number of clients and would open possibility for denial of service type attacks on server.

Figure 3B:
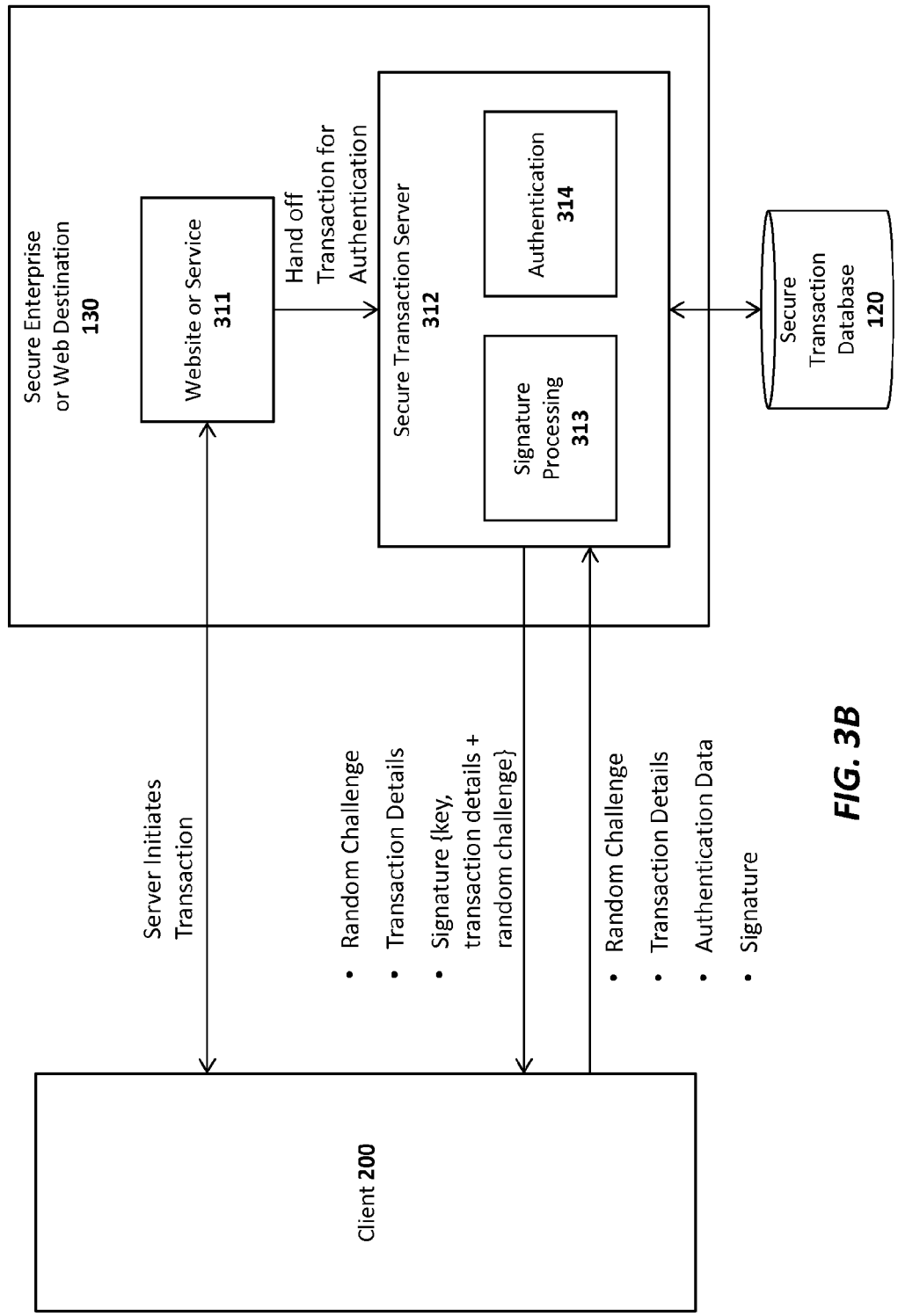

One embodiment of the invention is illustrated in FIG. 3B which shows a website or other network service 311 initiating a transaction with a client 200. For example, the user may have selected items for purchase on the website and may be ready to check out and pay. In the illustrated example, the website or service 311 hands off the transaction to a secure transaction server 312 which includes signature processing logic 313 for generating and verifying signatures (as described herein) and authentication logic for performing client authentication 314 (e.g., using the authentication techniques previously described).

In one embodiment, the authentication request sent from the secure transaction server 312 to the client 200 includes the random challenge such as a cryptographic nonce (as described above), the transaction details (e.g., the specific text presented to complete the transaction), and a signature generated by the signature processing logic 313 over the random challenge and the transaction details using a private key (known only by the secure transaction server).

Once the above information is received by the client, the user may receive an indication that user verification is required to complete the transaction. In response, the user may, for example, swipe a finger across a fingerprint scanner, snap a picture, speak into a microphone, or perform any other type of authentication permitted for the given transaction. In one embodiment, once the user has been successfully verified by the authentication device 210, the client transmits the following back to the server: (1) the random challenge and transaction text (both previously provided to the client by the server), (2) authentication data proving that the user successfully completed authentication, and (3) the signature.

The authentication module 314 on the secure transaction server 312 may then confirm that the user has correctly authenticated and the signature processing logic 313 regenerates the signature over the random challenge and the transaction text using the private key. If the signature matches the one sent by the client, then the server can verify that the transaction text is the same as it was when initially received from the website or service 311. Storage and processing resources are conserved because the secure transaction server 312 is not required to persistently store the transaction text (or other transaction data) within the secure transaction database 120.

Figure 4:
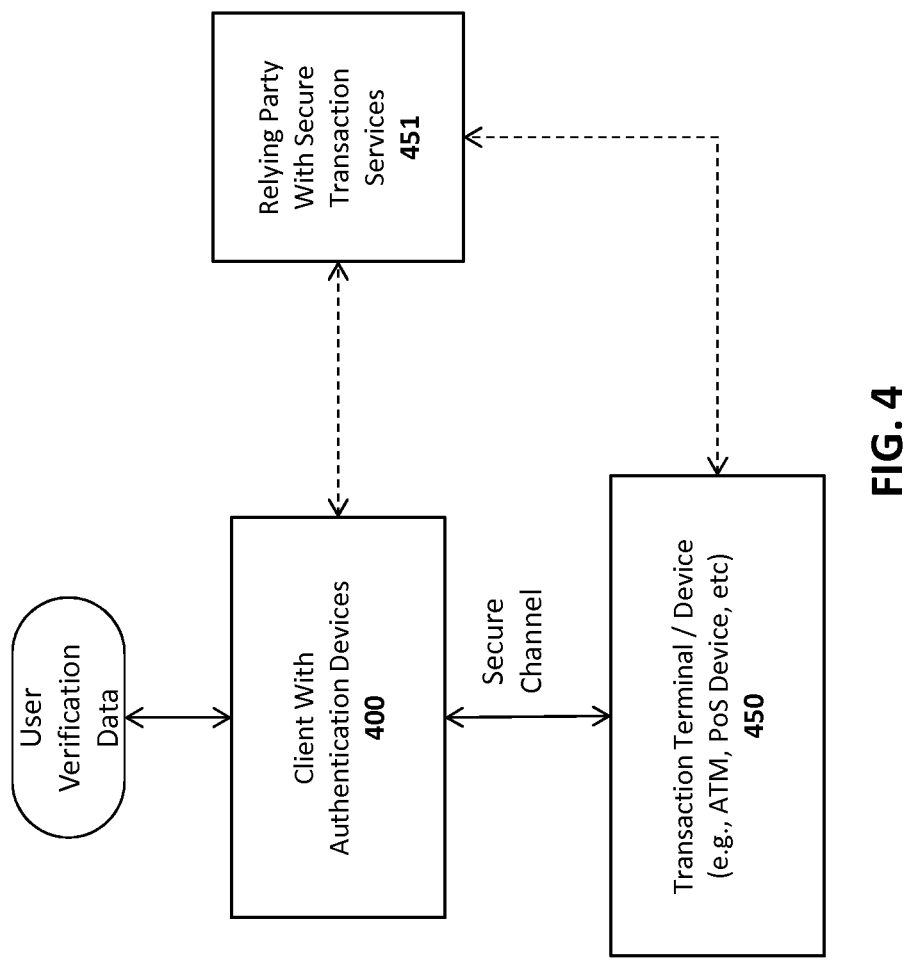
FIG. 4 illustrate one embodiment of the invention for performing authentication for a transaction with a device without established relation.

System and Method for Authenticating a Client to an Offline Device or a Device Having Limited Connectivity As mentioned, one embodiment of the invention includes techniques for authenticating the user locally (i.e. verifying the user), even in circumstances where the user device and device are offline (i.e., not connected to a back-end authentication server of a relying party) or semi-offline (i.e., where the user device is not connected to the relying party, but the device is). FIG. 4 illustrates one such arrangement in which a client 400 with authentication devices previously registered with a relying party 451 establishes a secure channel with a transaction device 450 to complete a transaction. By way of example, and not limitation, the transaction device may be an ATM, point-of-sale (PoS) transaction device at a retail location, Internet of Things (IoT) device, or any other device capable of establishing a channel with the client 400 and allowing the user to perform a transaction. The channel may be implemented using any wireless communication protocol including, by way of example and not limitation, near field communications (NFC) and Bluetooth (e.g., Bluetooth Low Energy (BTLE) as set forth in the Bluetooth Core Specification Version 4.0). Of course, the underlying principles of the invention are not limited to any particular communication standard.

As indicated by the dotted arrows, the connection between the client 400 and the relying party 451 and/or the connection between the transaction device 450 and the relying party 451 may be sporadic or non-existent. Real world applications in the area of payments often rely on such "off-line" use-cases. For example, a user with a client 400 (e.g., a Smartphone) may not have connectivity to the relying party 451 at the time of the transaction but may want to authorize a transaction (e.g. a payment) by authenticating to the transaction device 450. However, in some embodiments of the invention, the client 400 and/or transaction device 450 do exchange some information with the relying party 451 (although not necessarily during the authentication or transaction confirmation process described herein).

Traditionally, user verification has been implemented using a secret such as a personal identification number (PIN) to be captured by the device (e.g. the PoS transaction device or ATM). The device would then create an online connection to the relying party in order to verify the secret or would ask the user's authenticator (e.g., EMV banking card) for verifying the PIN. Such implementation has several disadvantages. It might require an online connection—which might be available sometimes, but not always. It also requires the user to enter a long-term valid secret into potentially untrusted devices, which are subject to shoulder-surfing and other attacks. Additionally it is inherently tied to the specific user verification method (e.g. PIN in this case). Finally, it requires the user to remember a secret such as a PIN, which may be inconvenient to the user.

The authentication techniques described herein provide significantly more flexibility in terms of user verification methods and security as they allow the user to rely on his/her own client's authentication capabilities. In particular, in one embodiment, a mobile application on the user's client caches authentication requests provided by the relying party during a time when the client is connected to the relying party. The authentication requests may include the same (or similar) information as the authentication requests described above (e.g., a nonce and a public key associated with an authenticator) as well as additional information including a signature over (at least parts of) the authentication request generated by a relying party, the verification key and potentially timing data indicating the time period within which the authentication request will remain valid (or conversely, the time after which the authentication request will expire). In one embodiment, the mobile application may cache multiple such connection requests (e.g., one for each transaction device or transaction device type).

In one embodiment, the cached authentication requests may then be used for transactions with the transaction device, in circumstances where the client/mobile app is incapable of connecting with the relying party. In one embodiment, the mobile app triggers the creation of the authentication response based on the cached authentication request containing the serverData and additional data received from the transaction device. The authentication response is then transmitted to the transaction device which then verifies the authentication response using a verification key provided from the relying party (e.g., during a time when the transaction device is connected with the relying party). In particular, the transaction device may use the key provided by the relying party to verify the signature over the serverData included in the authentication response. In one embodiment, the signature is generated by the relying party using a private relying party verification key and the transaction device verifies the signature using a corresponding public relying party verification key (provided to the transaction device by the relying party).

Once the transaction device verifies the serverData extracted from the authentication response, it may then use the public key extracted from the authentication request (e.g., Uauth.pub) to verify the authentication response generated by the client/mobile app (e.g., in the same or a similar manner to the verifications by the relying party described above, when the client is authenticating directly to the relying party).

In an alternate embodiment described below, the relying party provides the authentication request directly to the transaction device (rather than through the mobile app on the client device). In this embodiment, the transaction device may ask for the authentication request from the relying party upon receiving a request to complete a transaction from the mobile app on the client. Once it has the authentication request, it may validate the request and the authentication response as described above (e.g., by generating a signature and comparing it to the existing signature).

Figure 5A:
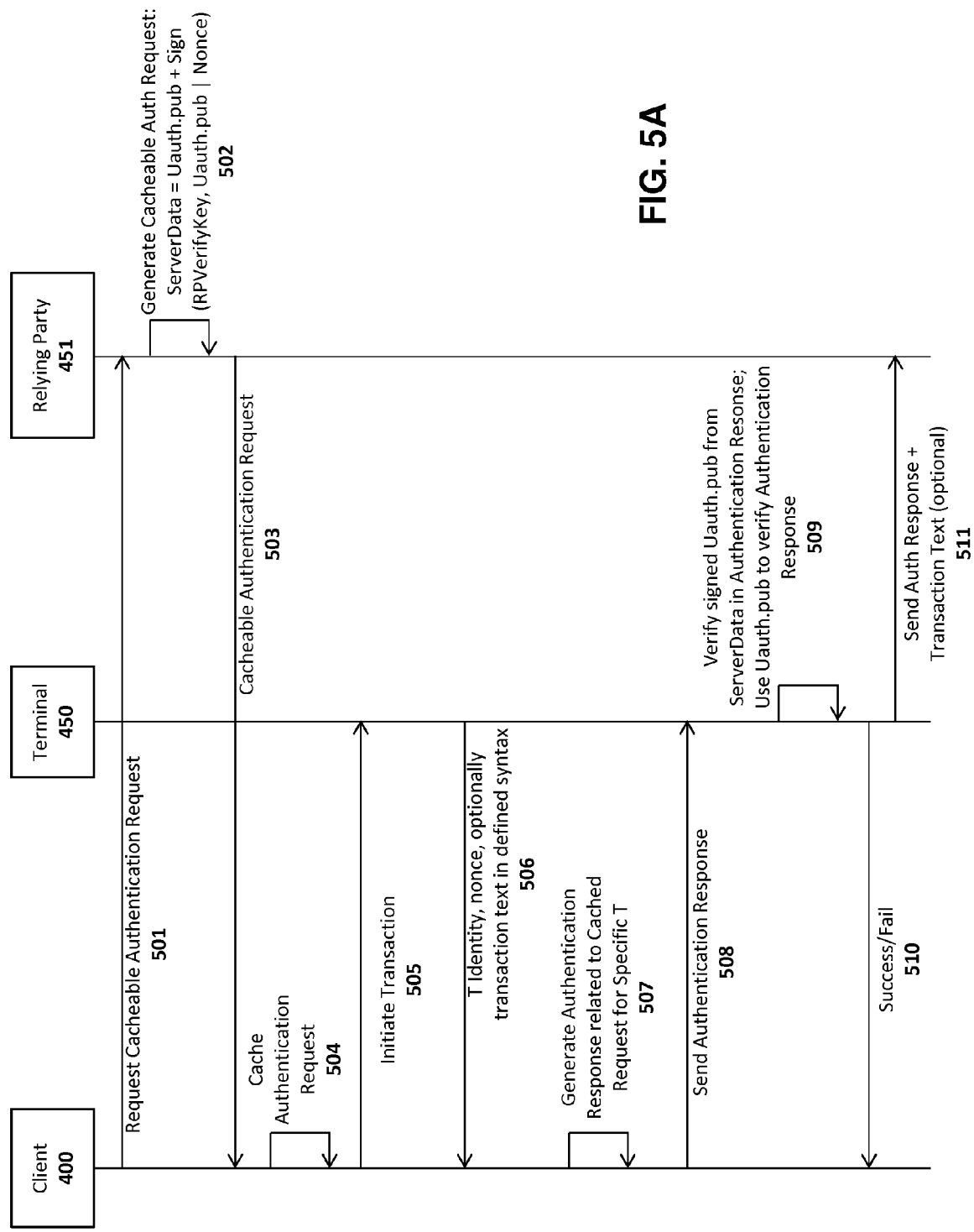

FIG. 5A is a transaction diagram showing interactions between the client 400, transaction device 450 and relying party in an embodiment in which the client 400 caches the authentication request. This embodiment is sometimes referred to as the "full-offline" embodiment because it does not require the transaction device 450 to have an existing connection with the relying party.

At 501, the client requests a cacheable authentication request from the relying party. At 502, the relying party generates the cacheable authentication request, at 503 the authentication request is sent to the client, and at 504 the client caches the authentication request. In one embodiment, the authentication request includes the public key associated with the authenticator to be used for authentication (Uauth.pub) and a signature generated using the relying party verification key (RPVerifyKey) over the public key and a random nonce. If asymmetric keys are used, then RPVerifyKey used by the relying party to generate the signature is a private key having a corresponding public RPVerifyKey which the relying party has provided to the transaction device (potentially far in advance of processing the user authentication request).

In one embodiment, the authentication request also includes timing information indicating the length of time for which the authentication request will be valid (e.g., MaxCacheTime). In this embodiment, the signature for the cacheable authentication request may be generated over the combination of the public authentication key, the nonce, and the MaxCacheTime (e.g., ServerData=Uauth.pub|MaxCacheTime|serverNonce|Sign (RPVerifyKey, Uauth.pub|MaxCacheTime|serverNonce)). In one embodiment, the authentication response includes more than one authentication key (e.g., one for each authenticator capable of authenticating the user) and the signature may be generated over all of these keys (e.g., along with the nonce and the MaxCacheTime).

As mentioned, the public RPVerifyKey needs to be known the transaction device 450, or any device intended to perform offline verification of the authentication requests/responses. This extension is required because the transaction device does not have any knowledge about the authentication keys registered at the relying party (i.e. no established relation exists between user device and the transaction device). Consequently, the relying party must communicate to the transaction device (or other device), in a secure manner, which key(s) are to be used for authentication response verification. The transaction device will verify the MaxCacheTime to determine whether the cached authentication request is still valid (to comply with the relying party's policy on how long the cached authentication request may be used).

At 505, the client establishes a secure connection to the transaction device and initiates a transaction. For example, if the transaction device is a PoS transaction device, the transaction may involve a debit or credit transaction. If the transaction device is an ATM, the transaction may involve a cash withdrawal or a maintenance task. The underlying principles of the invention are not limited to any particular type of transaction device or secure connection. In addition, at 505, the client may transmit the cached authentication request to the transaction device.

In response, at 506 the transaction device may transmit device identity information (e.g., a transaction device identification code), a random challenge (nonce) and optionally transaction text in a defined syntax to complete the transaction. The random challenge/nonce will then be cryptographically bound to the authentication response. This mechanism allows the device to verify that the user verification is fresh and hasn't been cached/reused.

In order to support transaction confirmations such as described above (see, e.g., FIGS. 3A-B and associated text), the transaction device may be required to create a standardized, and human readable representation of the transaction. "Standardized" as used herein means a format that can be parsed by the relying party (e.g. for final verification as indicated in operation 511 below) and/or the transaction device. It needs to be human readable because transaction confirmations require the authenticator to display it on the secure display of the client 400. An example of such an encoding could be XML where XSLT is used for visualization.

At 507, to generate the authentication response, an authentication user interface is displayed directing the user to perform authentication on the client using a particular authenticator (e.g., to swipe a finger on a fingerprint sensor, enter a PIN code, speak into a microphone, etc). Once the user provides authentication, the authentication engine on the client verifies the identity of the user (e.g., comparing the authentication data collected from the user with the user verification reference data stored in the secure storage of the authenticator) and uses the private key associated with the authentication device to encrypt and/or generate a signature over the random challenge (and also potentially the transaction device ID and/or the transaction text). The authentication response is then transmitted to the transaction device at 508.

At 509, the transaction device uses the public RPVerifyKey to verify the signature on the serverData (received at 505) if it has not done so already. Once the serverData is verified, it knows the public key associated with the authenticator used to perform the authentication (Uauth.pub). It uses this key to verify the authentication response. For example, it may use the public authentication key to decrypt or verify the signature generated over the nonce and any other related information (e.g., the transaction text, the transaction device ID, etc). If transaction confirmation is performed by the transaction device, then it may verify the transaction text displayed on the client by validating the signature generated over the transaction text and included in the authentication response at 508. Instead of having a cryptographically secured serverData structure, the transaction device could also verify unsigned serverData using an online connection to the relying party—if this is available (semi-offline case).

At 510, a success or failure indication is sent to the client depending on whether authentication was successful or unsuccessful, respectively. If successful, the transaction device will permit the transaction (e.g., debiting/crediting an account to complete a purchase, dispensing cash, performing administrative task, etc). If not, it will disallow the transaction and/or request additional authentication.

If a connection to the relying party is present, then at 511 the transaction device may transmit the authentication response to the relying party and/or the transaction text (assuming that the relying party is the entity responsible for verifying the transaction text). A record of the transaction may be recorded at the relying party and/or the relying party may verify the transaction text and confirm the transaction (not shown).

FIG. 5B is a transaction diagram showing interactions between the client 400, transaction device 450 and relying party in an embodiment in which the transaction device has a connection with and receives the authentication request from the relying party. This embodiment is sometimes referred to as the "semi-offline" embodiment because although the client does not have a connection to the relying party, the transaction device 450 does.

At 521, the client initiates a transaction, establishing a secure connection with the transaction device (e.g., NFC, Bluetooth, etc). At 522, the transaction device responsively asks for an authentication request from the relying party. At 523, the relying party generates the authentication request and at 524 the authentication request is sent to the transaction device. As in the embodiment shown in FIG. 5A, the authentication request may include the public key associated with the authenticator on the client to be used for authentication (Uauth.pub) and a signature generated using the relying party verification key (RPVerifyKey) over the public key and a random nonce. If asymmetric keys are used, then RPVerifyKey used by the relying party to generate the signature is a private key having a corresponding public RPVerifyKey which the relying party provides to the transaction device (potentially far in advance of processing the user authentication request). Instead of having a cryptographically secured serverData structure, the transaction device may also verify unsigned serverData using an online connection to the relying party—if this is available (semi-offline case).

In one embodiment, the serverData also includes timing information indicating the length of time for which the authentication request will be valid (e.g., MaxCacheTime). In this embodiment, the signature for the serverData may be generated over the combination of the public authentication key, the nonce, and the MaxCacheTime (e.g., ServerData=Uauth.pub|MaxCacheTime|serverNonce|Sign (RPVerifyKey, Uauth.pub|MaxCacheTime|serverNonce)). In one embodiment, the authentication response includes more than one authentication key (e.g., one for each authenticator) and the signature may be generated over all of these keys (e.g., along with the nonce and the MaxCacheTime).

In one embodiment, the remainder of the transaction diagram in FIG. 5B operates substantially as shown in FIG. 5A. At 525 the transaction device may transmit identity information (e.g., a transaction device identification code), a random challenge (nonce) and optionally transaction text in a defined syntax to complete the transaction. The random challenge/nonce will then be cryptographically bound to the authentication response. This mechanism allows the device to verify that the user verification is fresh and hasn't been cached.

In order to support transaction confirmations such as described above (see, e.g., FIGS. 3A-B and associated text), the transaction device may be required to create a standardized, and human readable representation of the transaction. "Standardized" as used herein means a format that can be parsed by the relying party (e.g. for final verification as indicated in operation 511 below) and/or the transaction device. It needs to be human readable because transaction confirmations require the authenticator to display it on the secure display of the client 400. An example of such an encoding could be XML where XSLT is used for visualization.

At 526, to generate the authentication response, an authentication user interface is displayed directing the user to perform authentication on the client using a particular authenticator (e.g., to swipe a finger on a fingerprint sensor, enter a PIN code, speak into a microphone, etc). Once the user provides authentication, the authentication engine on the client verifies the identity of the user (e.g., comparing the authentication data collected from the user with the user verification reference data stored in the secure storage of the authenticator) and uses the private key associated with the authentication device to encrypt and/or generate a signature over the random challenge (and also potentially the transaction device ID and/or the transaction text). The authentication response is then transmitted to the transaction device at 527.

At 528, the transaction device uses the public RPVerifyKey to verify the signature on the serverData (received at 524) if it has not done so already. Once the serverData is verified, it knows the public key associated with the authenticator used to perform the authentication (Uauth.pub). It uses this key to verify the authentication response. For example, it may use the public authentication key to decrypt or verify the signature generated over the nonce and any other related information (e.g., the transaction text, the transaction device ID, etc). If transaction confirmation is performed by the transaction device, then it may verify the transaction text displayed on the client by validating the signature generated over the transaction text and included in the authentication response at 528. Instead of having a cryptographically secured serverData structure, the transaction device could also verify unsigned serverData using an online connection to the relying party—if this is available (semi-offline case).

At 529, a success or failure indication is sent to the client depending on whether authentication was successful or unsuccessful, respectively. If successful, the transaction device will permit the transaction (e.g., debiting/crediting an account to complete a purchase, dispensing cash, performing administrative task, etc). If not, it will disallow the transaction and/or request additional authentication.

At 530 the transaction device may transmit the authentication response to the relying party and/or the transaction text (assuming that the relying party is the entity responsible for verifying the transaction text). A record of the transaction may be recorded at the relying party and/or the relying party may verify the transaction text and confirm the transaction (not shown).

Figure 6:
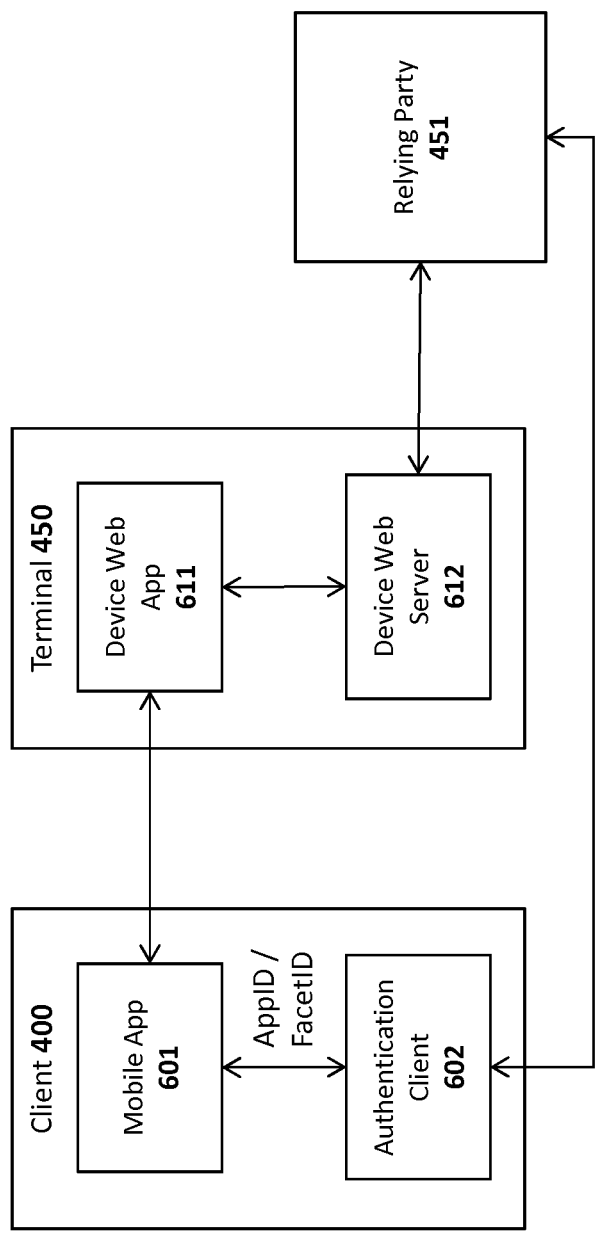
FIG. 6 illustrates additional architectural features employed in one embodiment of the invention.

As illustrated in FIG. 6, in one embodiment, a mobile app 601 is executed on the client to perform the operations described herein in combination with an authentication client 602 (which may be the secure transaction service 201 and interface 202 shown in FIG. 2B). In particular, the mobile app 601 may open a secure channel to a web app 611 executed on the transaction device 450 using transport layer security (TLS) or other secure communication protocol. A web server 612 on the transaction device may also open a secure channel to communicate with the relying party 451 (e.g., to retrieve authentication requests and/or to provide updates to the relying party 451 as discussed above). The authentication client 602 may communicate directly with the relying party 451 to, for example, retrieve cacheable authentication requests (as discussed in detail above).

In one embodiment, the authentication client 602 may identify the relying party and any authorized Mobile Apps 601 with an "AppID" which is a unique code associated with each application made available by a relying party. In some embodiments, where a relying party offers multiple online services, a user may have multiple AppIDs with a single relying party (one for each service offered by the relying party).

In one embodiment, any application identified by an AppID may have multiple "facets" which identify the allowable mechanisms and/or application types for connecting with the relying party. For example, a particular relying party may allow access via a Web service and via different platform-specific mobile apps (e.g., an Android App, an iOS App, etc). Each of these may be identified using a different "FacetID" which may be provided by the relying party to the authentication engine as illustrated.

In one embodiment, the calling mobile app 601 passes its AppID to the API exposed by the authentication client 602. On each platform, the authentication client 602 identifies the calling app 601, and determines its FacetID. It then resolves the AppID and checks whether the FacetID is included in a TrustedApps list provided by the relying party 451.

In one embodiment, the cacheable authentication requests discussed above may be implemented using bearer tokens such as illustrated in FIGS. 7 and 8. In the embodiments of the invention described herein, the token recipient (the transaction device 450), needs to be able to verify the token, the authentication response and the binding of the token to the authentication response without requiring another "online" connection to the token issuer (the relying party).

Two classes of bearer tokens should be distinguished:

1. Tokens which can only be verified by the recipient (e.g., the transaction device 450) using a different channel to the issuer (e.g., the relying party 451), that must exist between the token issuance and the token verification. This class of tokens is referred to herein as "unsigned tokens."

2. Tokens which can be verified by the recipient due to their cryptographic structure, e.g., because they contain a digital signature which can be verified using data received from the token issuer, potentially way before the specific token was issued. This class of tokens is referred to herein as "signed tokens".

The term "signed token structure" Is used herein to refer to both the signed token including the Uauth.pub key and the signed structure containing the token.

Binding Signed Tokens to Authentication Keys

As illustrated in FIG. 7, in one embodiment, in order to bind signed tokens to the Authentication Key, the token issuer (e.g., the relying party 451): (a) adds the Authentication public key (Uauth.pub) 702 to the to-be-signed portion 701 of the (to-be-) signed token; and (b) includes that signed token in the to-be-signed portion of the authentication response. By doing this, the token recipient (e.g., the transaction device 450) can verify the token by validating the signature 703 (e.g., the public RPVerifyKey discussed above). If the verification succeeds, it can extract the public key (Uauth.pub) and use it to verify the authentication response, as previously discussed.

Binding Unsigned Tokens to Authentication Keys

As illustrated in FIG. 8, in order to bind unsigned tokens 802 to the Authentication Key, in one embodiment, the token issuer (e.g., the relying party 451) creates a signed structure covering (at least) the original token 802 and to-be-signed data 801 which includes the authentication public key (Uauth.pub). The signed structure can be verified by validating the signature 803 using the public key related to the private signing key (e.g., the RPVerifyKey pair discussed above). This public signing key needs to be shared with the token recipient (e.g., the transaction device 450). Sharing can be done once after generation of the signing key pair, potentially way before the first signed structure was generated.

The techniques described herein support both the "full-offline" implementation (i.e., the transaction device 450 has no connection to the relying party 451 at the time of the transaction) as well as the "semi-offline" implementation (i.e., the transaction device has a connection to the relying party 451 at the time of the transaction, but the client does not.

Even in the full-offline case, the transaction device 450 is still expected to be connected via a host from time to time to the relying party 451. For example, the host may collect all responses stored in the transaction device 450 in order to send them to the relying party and may also update (if required) the list of revoked Uauth keys (e.g., the public authentication keys which have been revoked since the last connection).

Some embodiments also support pure (session) authentication as well as transaction confirmation. Even in the case of transaction confirmation, the relying party 451 can verify the transaction, if the transaction device 450 submits the transaction text along with the authentication response to the relying party 451.

There several different use cases/applications for the techniques described herein. For example:

1. Payment.

A user has registered his authenticator (e.g. a smartphone) with a payment service provider (PSP). The user wants to authenticate a payment at some merchant using a Point-of-Sale device (PoS) authorized by the PSP, but the PoS doesn't have a reliable and permanent online connection to the PSP (e.g. located in a Bus). In this example, the PoS may be implemented as the transaction device 450 and the PSP may be implemented as the relying party 451 described above to allow the transaction notwithstanding the lack of a reliable and permanent connection.

2. Internet-of-Things.

A company has installed several embedded devices (e.g. in a factory, building, etc.). Maintenance of such devices is performed by a technicians employed by a contracted party. For performing the maintenance the technician has to authenticate to the device in order to prove his eligibility for the task. The following assumptions are made (based on realistic frame conditions):

a. The technician cannot perform registration with each of such devices (as there are too many of them).

b. There are too many technicians and too much fluctuation of such technicians in order to keep the list of eligible technicians up-to-date on each of the devices.

c. Neither the device nor the technician's computer has a reliable network connection at the time of maintenance.

Using the techniques described above, the company can inject a trust anchor (e.g., the public RPVerifyKey) into all devices once (e.g., at installation time). Each technician then registers with the contracted party (e.g., the relying party 451 which may be the technician's employer). Using the above techniques, the technician will be able to authenticate to each device.

The embodiments of the invention described above may be implemented in any system in which a client with authentication capabilities is registered with a relying party and the authentication operation is performed between this client and a device (a) acting on behalf of the relying party and (b) being offline (i.e. not having a reliable network connection to the relying party's original server the client has been registered with) at the time of transaction. In such a case, the client receives a cacheable authentication request from the original server and caches it. Once it is required, the client computes the authentication response and sends it to the device.

In another embodiment, the client adds channel binding data (received in the authentication request) to the response in a cryptographically secure way. By doing this, the relying party's original server can verify that the request was received by a legitimate client (and not some man-in-the-middle).

In one embodiment, the relying party adds additional authenticated data to the response such as the Uauth.pub key which allows the device to verify the authentication or transaction confirmation response, without having to contact the relying party server for retrieving the approved Uauth.pub key. In another embodiment, the relying party requires the user of the client to perform a successful authentication before issuing the "cacheable" authentication requests (in order to prevent denial of service attacks). In one embodiment, the relying party requires the client to indicate whether a request needs to be cacheable or not. If cacheable, the relying party may require additional authentication data in the response (e.g., the MaxCacheTime discussed above).

In one embodiment, a device such as the transaction device 450 does not have a direct network connection to the relying party and is "synchronized" to the relying party using a separate computer (sometimes referred to herein as the "host"). This host retrieves all collected authentication responses from the device and transfers them to the relying party. Additionally the host may also copy a list of revoked Uauth keys to the device to ensure that one of the revoked keys is not used in an authentication response.

In one embodiment, a device such as the transaction device 450 sends a random value (e.g., nonce) to the client and the client cryptographically adds this random value as an extension to the authentication response before signing it. This signed random value serves as a freshness proof to the device.

In one embodiment, the client's authenticator adds the current time Ta as an extension to the authentication response before signing it. The device/transaction device may compare that time to the current time Td and only accept the response if the difference between Ta and Td is acceptable (e.g., if the difference is less than two minutes (abs(Td−Ta)<2 min)).

In one embodiment, the relying party adds an authenticated (i.e., signed) expiration time to the cacheable request. As discussed above, the device/transaction device will only accept the response as valid if it is received before the expiration time.

In one embodiment, the relying party adds an authenticated (i.e., signed) data block (e.g., the "signed token structure" mentioned above) including additional information such as (but not limited to) public key, expiration time, maximum transaction value (e.g., Security Assertion Markup Language (SAML) assertions, OAuth tokens, JSON Web Signature (JWS) objects, etc) to the cacheable request. The device/transaction device may only accept the response as valid if the signed data block can be positively verified and the contents are acceptable.

In one embodiment, the relying party only adds the unsigned token to the cacheable authentication request, but the transaction device has an online connection to the relying party at the time of transaction. The transaction device verifies the authenticity of the unsigned token using the online connection to the relying party at the time of transaction.

Figure 9:
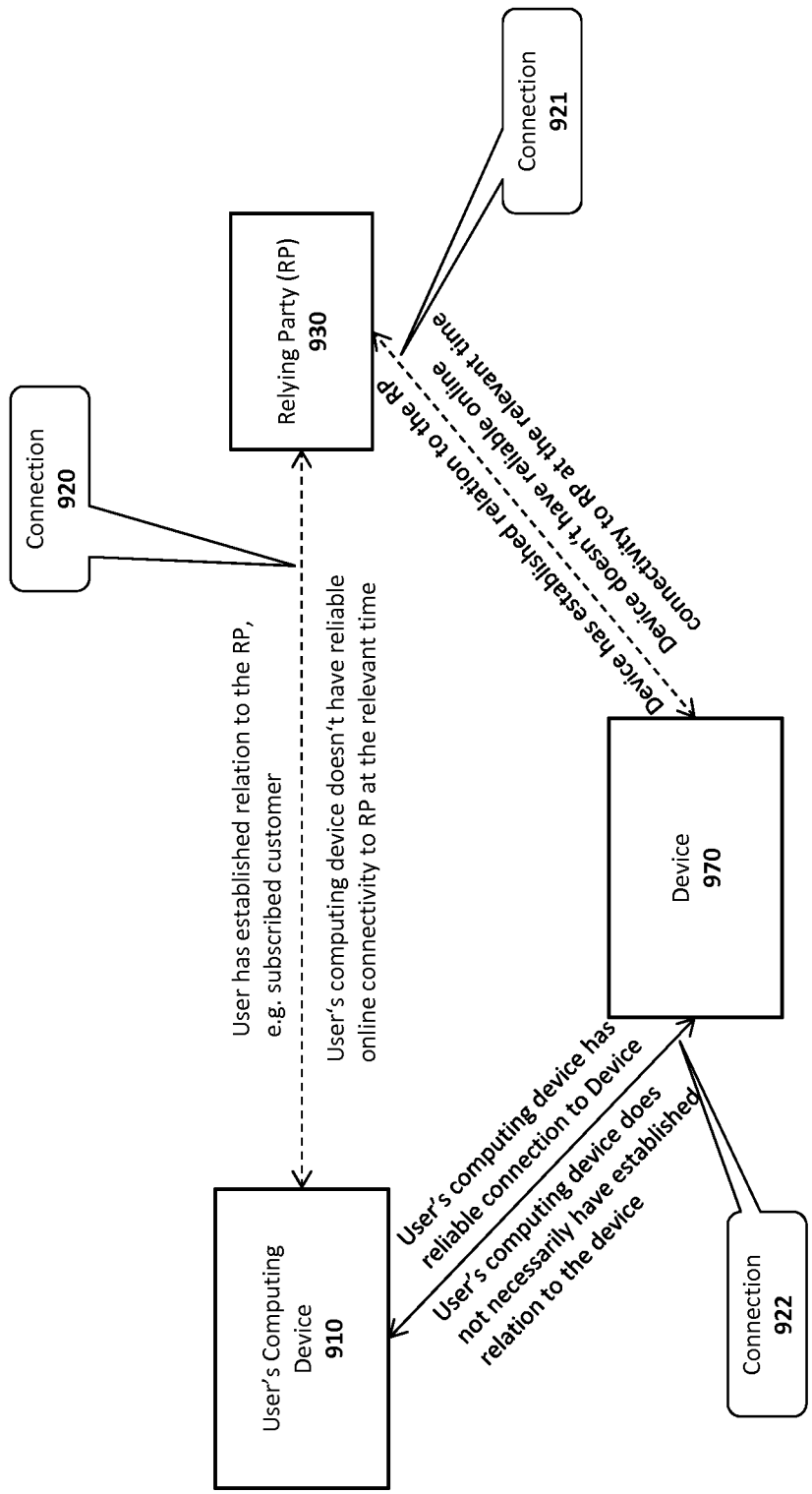
FIG. 9 illustrates exemplary "offline" and "semi-offline" authentication scenarios.

FIG. 9 illustrates exemplary "offline" and "semi-offline" authentication scenarios in accordance with one embodiment of the invention. In this embodiment, the user with a computing device 910 has an established relation to the relying party 930 and could authenticate to the relying party. However, in some circumstances, the user wants to perform a transaction (e.g., an authentication of a transaction confirmation) with a device 970 which has an established relation to the relying party 930 but not necessarily one to the user's computing device 910. With respect to this embodiment, the transaction is referred to as "full offline" if the connection 920 and connection 921 do not exist or are not stable at the relevant time (e.g., the time of authentication of the user's computing device 910 to the device 970 or of the transaction between the user's computing device 910 and the device 970). With respect to this embodiment, the transaction is "semi-offline" if the connection 920 between the user's computing device 910 and the relying party 930 is not stable, but the connection 921 between the device 970 and the relying party 930 is stable. Note that in this embodiment, connection 922 between the user's computing device 910 and device 970 is required to be stable at the relevant time. It is also expected that the Authenticator to be connected to the user's computing device 910. The connection 922 could be implemented using any type of communication channels/protocols including, but not limited to, Bluetooth, Bluetooth low energy (BTLE), near field communication (NFC), Wifi, Global System for Mobile Communications (GSM), Universal Mobile Telecommunications System (UTMS), Long-Term Evolution (LTE) (e.g., 4G LTE), and TCP/IP.

Exemplary Data Processing Devices

Figure 10:
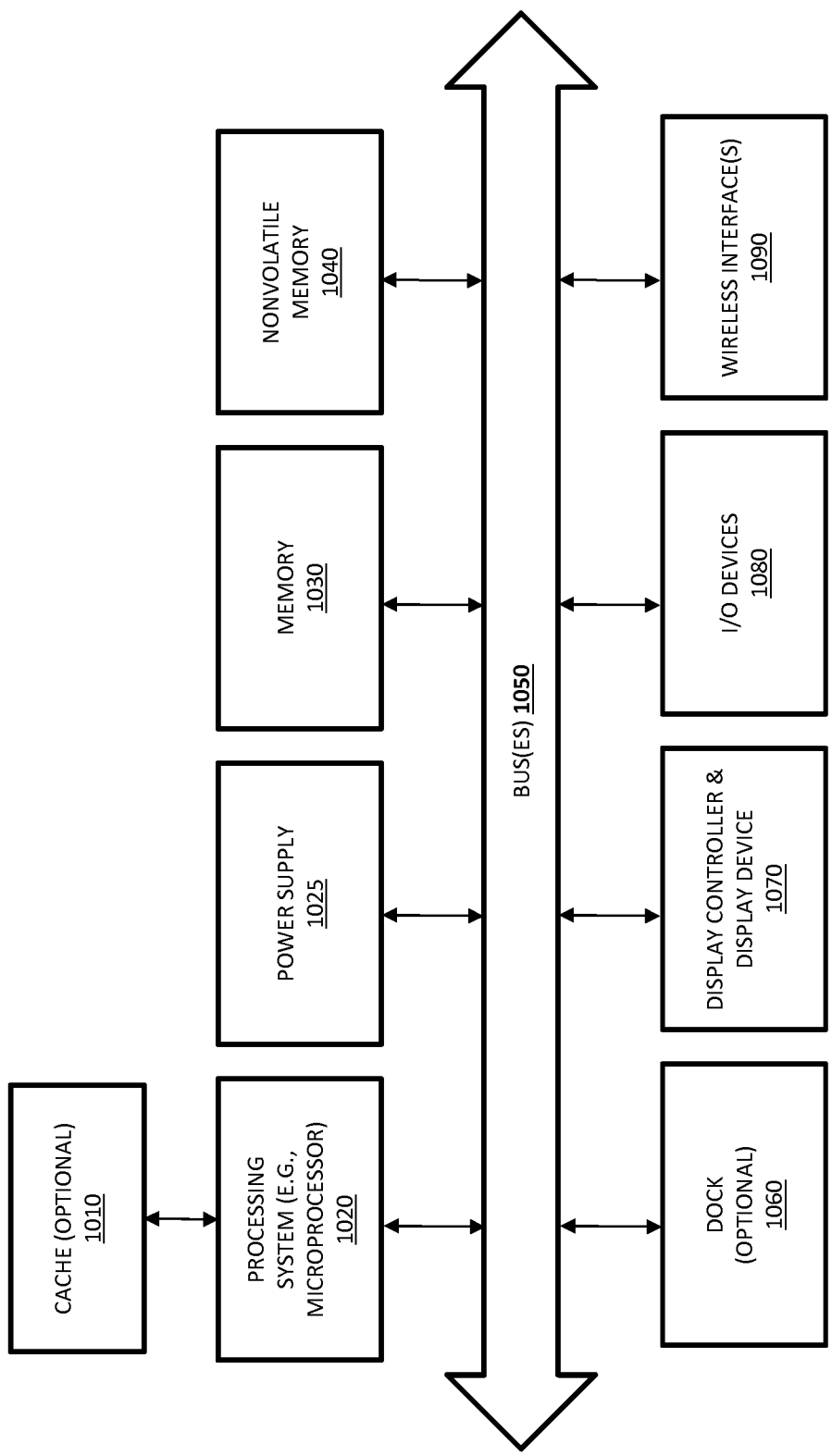
FIG. 10 illustrates an exemplary system architecture for clients and/or servers.

FIG. 10 is a block diagram illustrating an exemplary clients and servers which may be used in some embodiments of the invention. It should be understood that while FIG. 10 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 10, the computer system 1000, which is a form of a data processing system, includes the bus(es) 1050 which is coupled with the processing system 1020, power supply 1025, memory 1030, and the nonvolatile memory 1040 (e.g., a hard drive, flash memory, Phase-Change Memory (PCM), etc.). The bus(es) 1050 may be connected to each other through various bridges, controllers, and/or adapters as is well known in the art. The processing system 1020 may retrieve instruction(s) from the memory 1030 and/or the nonvolatile memory 1040, and execute the instructions to perform operations as described above. The bus 1050 interconnects the above components together and also interconnects those components to the optional dock 1060, the display controller & display device 1070, Input/Output devices 1080 (e.g., NIC (Network Interface Card), a cursor control (e.g., mouse, touchscreen, touchpad, etc.), a keyboard, etc.), and the optional wireless transceiver(s) 1090 (e.g., Bluetooth, WiFi, Infrared, etc.).

Figure 11:
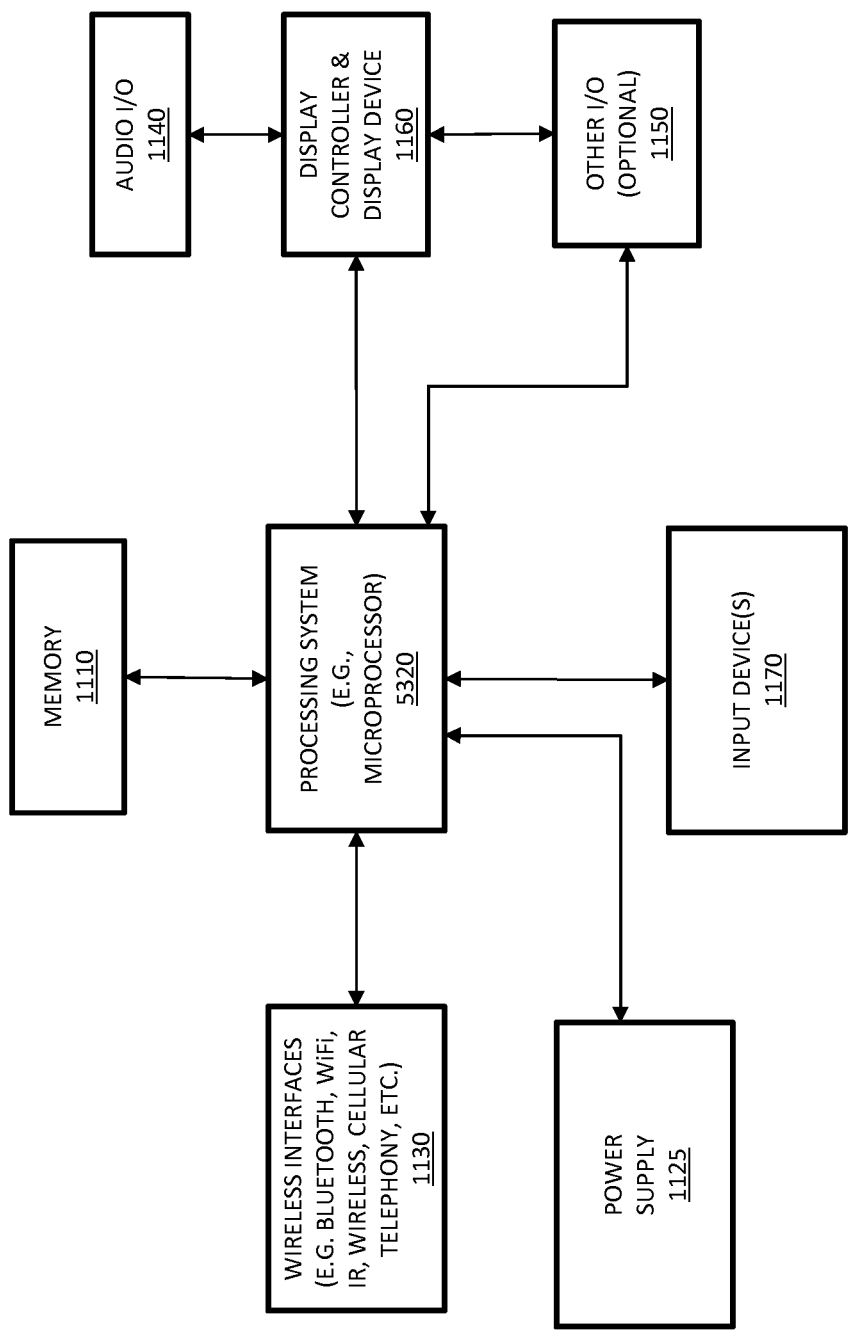
FIG. 11 illustrates another exemplary system architecture for clients and/or servers.

FIG. 11 is a block diagram illustrating an exemplary data processing system which may be used in some embodiments of the invention. For example, the data processing system 190 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 1100 may be a network computer or an embedded processing device within another device.

According to one embodiment of the invention, the exemplary architecture of the data processing system 1100 may be used for the mobile devices described above. The data processing system 1100 includes the processing system 1120, which may include one or more microprocessors and/or a system on an integrated circuit. The processing system 1120 is coupled with a memory 1110, a power supply 1125 (which includes one or more batteries) an audio input/output 1140, a display controller and display device 1160, optional input/output 1150, input device(s) 1170, and wireless transceiver(s) 1130. It will be appreciated that additional components, not shown in FIG. 11, may also be a part of the data processing system 1100 in certain embodiments of the invention, and in certain embodiments of the invention fewer components than shown in FIG. 11 may be used. In addition, it will be appreciated that one or more buses, not shown in FIG. 11, may be used to interconnect the various components as is well known in the art.

The memory 1110 may store data and/or programs for execution by the data processing system 1100. The audio input/output 1140 may include a microphone and/or a speaker to, for example, play music and/or provide telephony functionality through the speaker and microphone. The display controller and display device 1160 may include a graphical user interface (GUI). The wireless (e.g., RF) transceivers 1130 (e.g., a WiFi transceiver, an infrared transceiver, a Bluetooth transceiver, a wireless cellular telephony transceiver, etc.) may be used to communicate with other data processing systems. The one or more input devices 1170 allow a user to provide input to the system. These input devices may be a keypad, keyboard, touch panel, multi touch panel, etc. The optional other input/output 1150 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

I claim:

1. A method comprising:
   registering an authenticator of a client with a relying party, the registration allowing a user of the client to remotely authenticate the user to the relying party over a network;
   generating, at the relying party, a first authentication structure using at least a first authentication key associated with the authenticator and a signature generated with a first verification key;
   caching the first authentication structure on the client;
   providing a second verification key corresponding to the first verification key to a transaction device; and
   performing an authentication transaction between the client and the transaction device in which the client generates a second authentication structure using a second authentication key associated with the first authentication key, the transaction device uses the second verification key to validate the signature on the first authentication structure and uses the first authentication key to validate the second authentication structure, wherein the first and second verification keys are the same keys and/or wherein the first and second authentication keys are the same keys.

2. The method as in claim 1 wherein the first verification key is a private key used to generate the signature and the second verification key provided to the transaction device is a corresponding public verification key configured to validate the signature.

3. The method as in claim 1 wherein the second authentication key comprises a private authentication key associated with the authenticator and the first authentication key is a corresponding public authentication key.

4. The method as in claim 1, wherein the first authentication key comprises a public key associated with the authenticator (Uauth.pub) and the signature is generated over at least the public key using the first verification key.

5. The method as in claim 4 wherein the first authentication structure comprises a combination of a nonce generated by the relying party, the public key and the signature generated over the combination of the nonce and the public key.

6. The method as in claim 4 wherein the first authentication structure comprises a combination of a nonce generated by the relying party, cache timing data indicating an amount of time the first authentication structure can be cached on the client, the public key and the signature generated over the combination of the nonce, the cache timing data, and the public key.

7. The method as in claim 4 wherein the second authentication structure comprises a nonce or a value provided by the transaction device and a signature generated by applying the second authentication key over at least the nonce and/or the value provided by the transaction device.

8. The method as in claim 4 wherein the second authentication structure comprises a signature generated by applying the second authentication key over transaction text securely displayed on the client during a transaction with the transaction device.

9. The method as in claim 8 wherein the signature is verified by the transaction device and/or the relying party using the first authentication key.

10. A method comprising:
    registering an authenticator of a client with a relying party, the registration allowing a user of the client to remotely authenticate the user to the relying party over a network;
    generating, at the relying party, a first authentication structure using at least a first authentication key associated with the authenticator and a signature generated with a first verification key;
    storing the first authentication structure on a transaction device responsive to a user request to initiate a transaction through the transaction device;
    providing a second verification key corresponding to the first verification key to the transaction device; and
    performing an authentication transaction between the client and the transaction device in which the client generates a second authentication structure using a second authentication key associated with the first authentication key, the transaction device uses the second verification key to validate the signature on the first authentication structure and uses the first authentication key to validate the second authentication structure, wherein the first and second verification keys are the same keys and/or wherein the first and second authentication keys are the same keys.

11. The method as in claim 10 wherein the first verification key is a private key used to generate the signature and the second verification key provided to the transaction device is a corresponding public verification key configured to validate the signature.

12. The method as in claim 10 wherein the second authentication key comprises a private authentication key associated with the authenticator and the first authentication key is a corresponding public authentication key.

13. The method as in claim 10, wherein the first authentication key comprises a public key associated with the authenticator (Uauth.pub) and the signature is generated over at least the public key using the first verification key.

14. The method as in claim 13 wherein the first authentication structure comprises a combination of a nonce generated by the relying party, the public key and the signature generated over the combination of the nonce and the public key.

15. The method as in claim 13 wherein the first authentication structure comprises a combination of a nonce generated by the relying party, cache timing data indicating an amount of time the first authentication structure can be cached on the client, the public key and the signature generated over the combination of the nonce, the cache timing data, and the public key.

16. The method as in claim 13 wherein the second authentication structure comprises a nonce or a value provided by the transaction device and a signature generated by applying the second authentication key over at least the nonce and/or the value provided by the transaction device.

17. The method as in claim 13 wherein the second authentication structure comprises a signature generated by applying the second authentication key over transaction text securely displayed on the client during a transaction with the transaction device.

18. The method as in claim 17 wherein the signature is verified by the transaction device and/or the relying party using the first authentication key.

19. A method comprising:
  registering an authenticator of a client with a relying party, the registration allowing a user of the client to remotely authenticate the user to the relying party over a network;
  generating, at the relying party, a first authentication structure using at least a first authentication key associated with the authenticator;
  caching the first authentication structure on the client; and
  performing an authentication transaction between the client and a transaction device in which the client generates a second authentication structure using a second authentication key associated with the first authentication key, the transaction device uses an online or out-of-band connection to the relying party to validate the first authentication structure and uses the first authentication key to validate the second authentication structure, wherein the first and second authentication keys are the same keys.

20. The method as in claim 19 wherein the second authentication key comprises a private authentication key associated with the authenticator and the first authentication key is a corresponding public authentication key.

21. The method as in claim 19 wherein the first authentication key comprises a public key associated with the authenticator (Uauth.pub).

22. The method as in claim 21 wherein the first authentication structure comprises a combination of a nonce generated by the relying party, the public key and a signature generated over the combination of the nonce and the public key.

23. The method as in claim 21 wherein the first authentication structure comprises a combination of a nonce generated by the relying party, cache timing data indicating an amount of time the first authentication structure can be cached on the client, the public key and a signature generated over the combination of the nonce, the cache timing data, and the public key.

24. The method as in claim 21 wherein the second authentication structure comprises a nonce or a value provided by the transaction device and a signature generated by applying the second authentication key over at least the nonce and/or the value provided by the transaction device.

25. The method as in claim 21 wherein the second authentication structure comprises a signature generated by applying the second authentication key over transaction text securely displayed on the client during a transaction with the transaction device.

26. The method as in claim 25 wherein the signature is verified by the transaction device and/or the relying party using the first authentication key.

* * * * *